J. W. HERBERT AND J. A. ANDREWS.
CHECK STRAP FOR PICK STICKS.
APPLICATION FILED APR. 2, 1919.
1,322,790.
Patented Nov. 25, 1919.
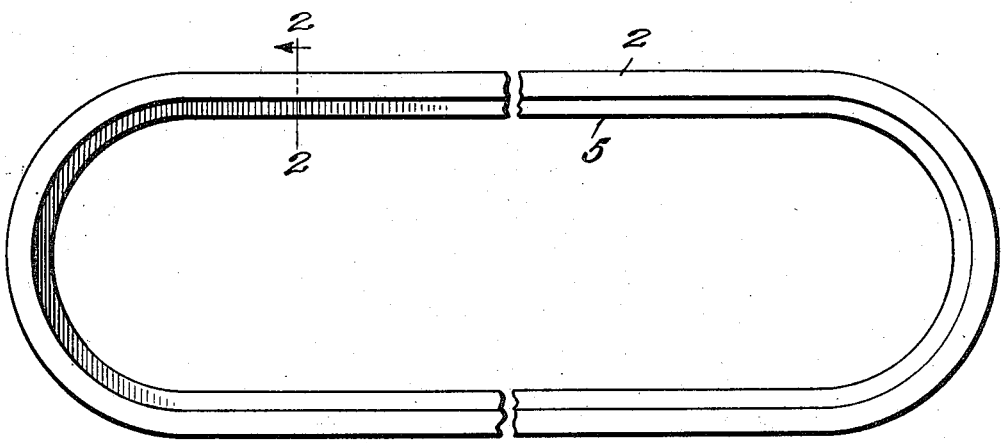
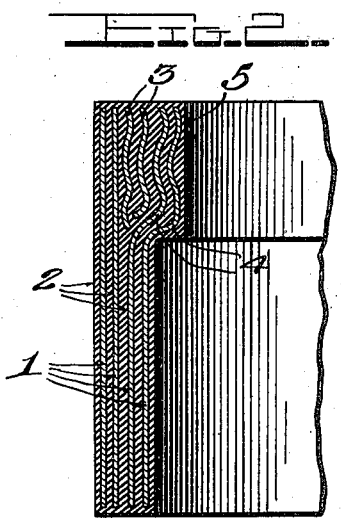
Witness
Ada E. Hagerty
Inventors
John W. Herbert
James A. Andrews
By Joseph A. Miller
Attorney

UNITED STATES PATENT OFFICE.

JOHN W. HERBERT AND JAMES A. ANDREWS, OF BIDDEFORD, MAINE.

CHECK-STRAP FOR PICK-STICKS.

1,322,790. Specification of Letters Patent. Patented Nov. 25, 1919.

Application filed April 2, 1919. Serial No. 287,044.

*To all whom it may concern:*

Be it known that we, JOHN W. HERBERT and JAMES A. ANDREWS, citizens of the United States, residing at Biddeford, in the county of York and State of Maine, have invented a new and useful Improvement in Check-Straps for Pick-Sticks, of which the following is a specification.

This invention relates to certain new and useful improvements in a check strap for pick sticks, and it has for its primary object to provide a strap having a reinforced upper edge whereby the full blow of the pick stick will be afforded a steadier and firmer cushioning effect as it oscillates within its guide.

The invention further resides in the formation of the check strap with a thickened upper edge portion to have the pick stick in its movement strike the full face of the belt or strap.

In the drawings—

Figure 1 is a bottom plan view of a check strap embodying the present invention, and Fig. 2 is a vertical section thereof on line 2—2 of Fig. 1.

Referring more in detail to the showing, the belt or strap is formed of a plurality of plies 1 of fabric impregnated with rubber composition 2, and in the upper edge portion of this rubberized belt are inserted additional plies 3 of narrow fabric to lend thickness thereto, as well as reinforcement. These added plies 3 are inserted midway between the side faces of the belt, the main plies or layers 1 inwardly of said added narrow plies being sufficiently wider to allow for the offset 4 away from the outer plies to provide the required spacing to receive the supplemental plies or strips.

This construction provides an internal rib or flange 5 about the upper edge portion of the strap to reinforce the same and receive the blow of the pick stick. The particular advantage for the varied thickness is that the strap will wear more evenly as a result of the stick first striking the upper or thickened and reinforced edge. In fabricating straps of uniform thickness the blow receiving upper edge, not having additional reinforcement, will soon wear and tear or split and thereby decrease the efficiency of the strap and finally render it altogether useless. In the improved structure the reinforced edge will long resist the blows of the stick. The strap is economically built up simply by laying the fabric in laminæ and then uniting the whole into a unitary body by means of the vulcanized rubber.

Having thus described our invention, what we claim as new and desire to secure by Letters Patent is—

1. A check strap for pick sticks, comprising a belt body formed of a plurality of plies of fabric cemented together by a rubber composition, the plies being separated along one edge throughout the length of the belt, and narrow strip-like plies inserted between the plies along their separated edge and united thereto by the rubber composition to form a belt body with a thickened edge portion.

2. A check strap comprising a plurality of fabric plies separated along one edge by offsetting the inner plies inwardly in substantially parallel relation, and inserting a plurality of narrow strips between the plies at their separated edge, the whole being bound into a unitary structure by a vulcanized rubber composition.

3. A check strap comprising a belt body thickened along its upper edge portion throughout its length.

4. A laminated check strap including comparatively wide and narrow strips, the narrow strip located along one edge of the wide strip to accord increased thickness to the check strap along one side edge only.

In testimony whereof we have signed our names to this specification in the presence of two subscribing witnesses.

JOHN W. HERBERT.
JAMES A. ANDREWS.

Witnesses:
 MABELLE SMITH,
 CHAS. M. HODGDON,